UNITED STATES PATENT OFFICE.

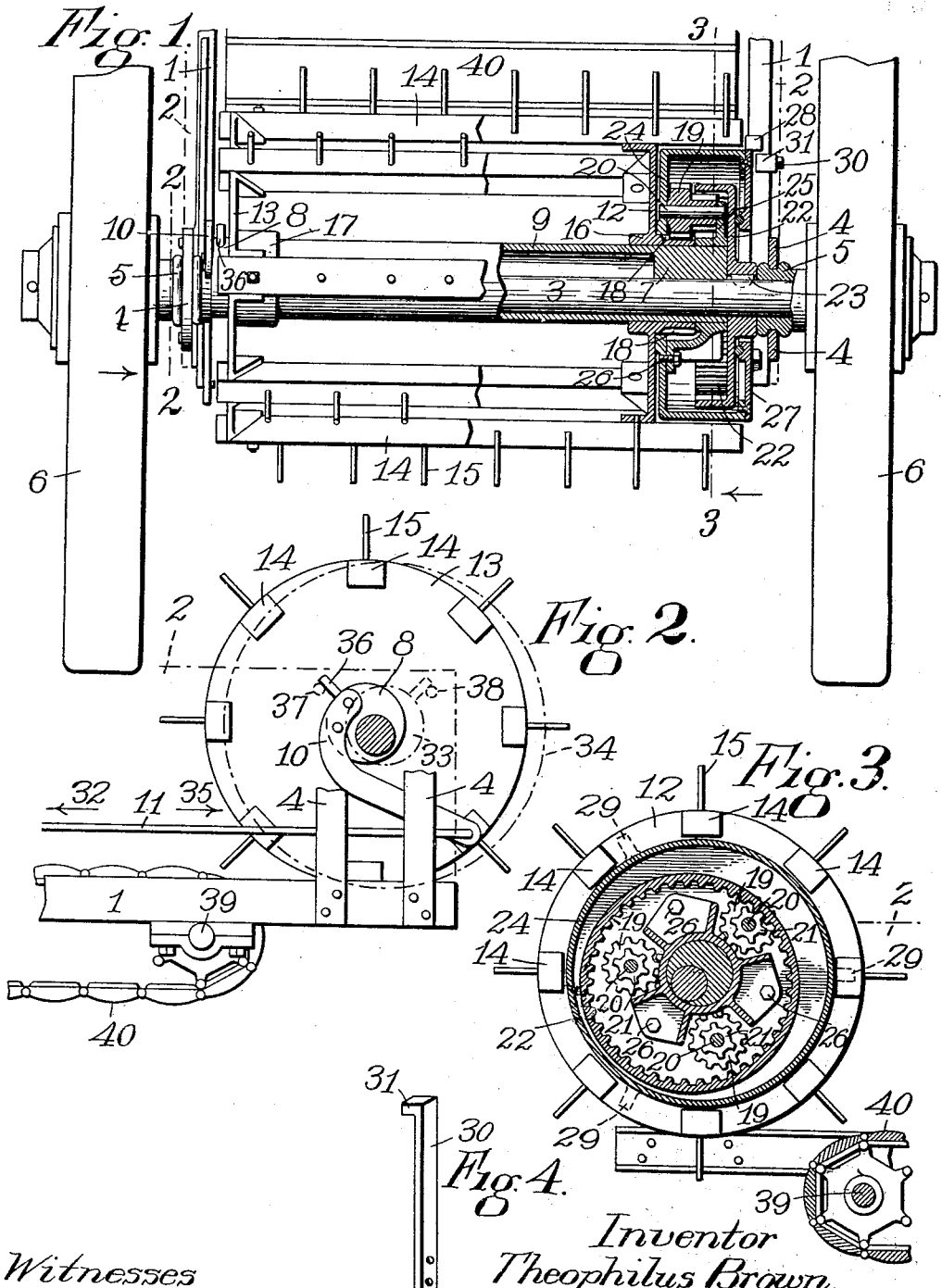

THEOPHILUS BROWN, OF WORCESTER, MASSACHUSETTS, ASSIGNOR, BY MESNE ASSIGNMENTS, TO MARSEILLES COMPANY, OF EAST MOLINE, ILLINOIS, A CORPORATION OF ILLINOIS.

MANURE-SPREADER.

1,215,615.  Specification of Letters Patent.  Patented Feb. 13, 1917.

Application filed October 2, 1911. Serial No. 652,421.

*To all whom it may concern:*

Be it known that I, THEOPHILUS BROWN, a citizen of the United States, residing at Worcester, in the county of Worcester and Commonwealth of Massachusetts, have invented a certain new and useful Improvement in Manure-Spreaders, of which the following is a specification accompanied by drawings, forming a part of the same.

My present invention relates to that class of manure spreaders comprising a body, a movable bottom by which the load may be gradually moved toward the rear of the body, and a revolving beater mounted at the rear of the body and in position to shred and distribute the load rearwardly. It has for its object to provide an improved method of mounting the beater and imparting rotary motion thereto, and to provide means by which the beater may be moved bodily toward and away from the rear end of the load, and these objects among others are secured by the construction and arrangement of parts as hereinafter described and illustrated in the accompanying drawings, in which—

Figure 1 represents a plan view of the rear end of a manure spreader, a portion of the beater being shown in central, horizontal section in order to disclose the driving mechanism.

Fig. 2 is an end view of the beater, the rear axle being shown in sectional view on the plane of the broken line 2—2, Fig. 1, and with the collar 5, forming one of the axle bearings removed.

Fig. 3 is an end view of the beater in sectional view on the plane of the broken line 3—3, Fig. 1.

Fig. 4 is a detached view of the stop bar by which the beater may be connected with the driving mechanism.

Similar reference letters and figures refer to similar parts in the different views.

Referring to the accompanying drawings, 1, 1, denote the sills by which the sides of the body are supported, said sides being removed in the drawings, but their position is indicated by the broken lines 2—2. Each of the sills 1, 1, are suspended from the rear axle 3 of the spreader by the inverted U-shaped hangers 4, 4, which inclose the collars 5, 5, which form the bearings for the rotatable rear axle 3. Attached to the opposite ends of the rear axle 3 are the rear supporting wheels 6, 6, by which rotary motion is imparted to the rear axle 3 as the spreader is moved forward over the ground. Journaled upon the rear axle 3 are two eccentric collars 7 and 8, the collar 7 being shown in Fig. 1 in central sectional view. The eccentric collars 7 and 8 are connected by a sleeve 9 and to the collar 8 is attached a bent lever 10, to the free end of which a rod 11 is pivotally connected leading from the lever 10 forward to the seat of the driver, by which an angular movement may be imparted to the lever 10 by either pushing or pulling upon the rod 11 in order to rock the eccentric collars 7 and 8 and sleeve 9 upon the rear axle 3.

The beater consists of the two circular heads 12 and 13, in the edges of which are mounted the bars 14 having radially projecting teeth 15. The heads 12 and 13 of the beater are provided with hollow hubs 16 and 17 which are journaled loosely upon the eccentric collars 7 and 8 and sleeve 9. The hub 16 of the beater is provided with a pinion 18 which is engaged by three pinions 19 rotating loosely upon spindles 20. Attached to the pinions 19 are smaller pinions 21 arranged to be engaged by an internal gear 22 which is keyed at 23 to the rear axle 3. The spindles 20 are held in a framework which is journaled upon the outside of the eccentric collar 7.

This framework comprises a cup shaped part 24, in the bottom of which one end of the spindles 20 are held, and a plate 25 in which the opposite ends of the spindles 20 are held, the plates 25 and the cup shaped portion 24 being bolted together by bolts 26, Figs. 1 and 3.

Whenever rotary motion is imparted to the rear axle 3 and internal gear 22, the entire framework carrying the spindles 20 is rotated around the eccentric collar 7, and during each rotation, the pinions 21 will be successively carried into and out of engagement with the internal gear 22. The cup shaped portion 24 of the framework is provided with a cover 27 bolted to its rim and provided with three laterally projecting equidistant lugs 28, one of which is shown in Fig. 1, and the relative positions of the three are indicated by the broken lines 29 in Fig. 3.

Attached to one of the sills is an upright post 30 having its upper end bent at right angles to form a lip 31, Fig. 4. When the eccentric sleeve 9 and collars 7 and 8 are rotated by means of the lever 10 and rod 11 to bring the axis of the beater toward the forward end of the manure spreader or in advance of the axis of the rear axle 3, in which position it is represented in the drawings, then the lugs 28 are permitted to rotate freely without coming in contact with the lip 31 of the upright post 30. In this position the beater is disconnected from the driving power as the pinions 19 are free to rotate about the pinion 18 without imparting rotation thereto. If the rod 11 be drawn in the direction of the arrow 32, Fig. 2, the eccentric collars 7 and 8 and sleeve 9 will be rotated about the axis of the rear axle 3, bringing the eccentric collars into the position shown by the broken line 33, and the periphery of the beater into the position of the broken line 34, Fig. 2. In this position the beater will be moved rearwardly or away from the load and into a position in which the lip 31 will therefore act as a stop to check the further rotation of the framework carrying the spindles 20 and intermediate pinions 19 and 21. The position of the lugs 28 on the cover 27 is such that when the rotation of the intermediate pinions around the axis of the beater is checked, one of the pinions 21 will be in full engagement with the internal gear 22, which then becomes the driving member to impart rotary motion to the driven member or pinion 18 carried by the hub of the beater.

When the load has been distributed the rod 11 is pushed in the direction of the arrow 35, Fig. 2, to bring the beater into the position shown by solid lines in Fig. 2. The beater then serves the purpose of a tailboard during the loading of the spreader, and its passage to the field, no rotary motion being then imparted to the beater.

When the beater is carried into the position shown by broken lines 34, Fig. 2, its teeth 15 are partially released from the load and the beater is connected with the driving power. To the eccentric collar 8 I attach a radial pin 36 arranged to strike against stops held by the sides of the manure spreader in order to limit the rotative movement of the eccentric collar about the axle 3, the relative position of these stops being indicated by the broken lines 37 and 38, Fig. 2.

Upon the under side of the sills 1 bearings are provided for sprocket wheel shafts upon which the movable bottom is supported. One of these shafts is shown at 39, Figs. 2 and 3, upon which a pair of sprocket wheels are mounted in the usual manner supporting the movable bottom 40, comprising a series of hinged slats forming an apron upon which the load is supported and gradually moved toward the beater, as is common in manure spreaders of this class.

The entire beater driving gearing and mechanism is mounted within the cup-shaped drum 24. This train of gears, instead of being mounted on the shaft outside of the vertical plane of the sill 1, is carried inward on the axle so that it is entirely confined within the limits of the beater. To accomplish this purpose the circular head 12 which supports the beater bars at the transmission end of the beater is slid inward on the sleeve 9 from the end of the bars a distance approximately equal to the depth of the cup-shaped casing 24. With machines of this class economy of space in the lateral distribution of parts upon the rear axle is of great importance. The tread or distance between the centers of the two rear wheels is necessarily limited to a fixed measurement which is determined by the width of the doors or gateways through which the vehicle must pass. The standard tread for such machines is five feet seven inches. In machines now generally in use the devices for transmitting power from the axle to the beater are located between the side board of the load-carrying body and the driving wheel. The various chains or gears through which power is transmitted in such machines occupy necessarily a considerable amount of lateral space and the sides of the body must be spaced inward from the wheels a sufficient distance to allow for this gearing thereby reducing the carrying capacity. Applicant has obtained a decided advantage over such machines by constructing a transmission which is located entirely within the confines of the beater, is entirely incased to prevent dirt or liquids from entering and clogging the gears and, at the same time, allows the side boards of the load-carrying body to be extended to points in close proximity to the wheels.

I claim,

1. In a manure spreader, a movable bottom, an axle extending transversely across the spreader above the plane of the bottom, a beater journaled eccentrically on said axle, means for holding the beater with its axis in either of several positions relatively to the axis of the axle, and supporting wheels mounted on the ends of said axle.

2. In a manure spreader, a movable bottom, a pair of supporting wheels having a common axis of rotation above the plane of the supporting surface of said bottom, a beater journaled on bearings eccentric to the axis of said supporting wheels, and means for rotating said eccentric beater bearings about the axis of said supporting wheels, whereby the beater is moved toward or away from the load.

3. In a manure spreader, a pair of supporting wheels having a common axis of rotation, beater bearings eccentric to and rotatable about the axis of said supporting wheels, means for rotating said bearings, and a rotatable beater journaled on said bearings.

4. In a manure spreader, a pair of supporting wheels, beater bearings eccentric to and rotatable about the axis of rotation of said supporting wheels, a beater rotatable about said bearings, and means for operatively connecting said beater and said supporting wheels.

5. In a manure spreader, bearings for a beater rotatable about an axis eccentric to the beater axis and passing through the circles of the said bearings, a beater journaled on said bearings, and means for rotating said bearings to move the beater toward and away from the load.

6. In a manure spreader, bearings for a beater eccentric to and rotatable about a common axis passing within the circles of the bearings, a beater journaled on said bearings, means for rotating said bearings to move the beater toward or away from the load, and means for limiting the rotative movement of said bearings.

7. In a manure spreader, a pair of supporting wheels, bearings for a rotatable beater capable of turning about an axis eccentric thereto and passing within the circles of the said bearings, a beater journaled on said bearings, and connecting mechanism between said beater and said supporting wheels for rotating the beater in a direction opposite to said wheels.

8. In a manure spreader, an axle extending transversely across the spreader, supporting wheels attached to the ends of said axle, bearings for a rotatable beater mounted on said axle and eccentrically to its axis, means for determining the position of said bearings on said axle, a rotatable beater journaled on said bearings, a pinion carried by said beater and concentric therewith, an internal gear attached to said axle and concentric therewith, an interposed framework between said beater pinion and said internal gear normally capable of rotation around the axis of the beater, pinions carried by said frame intermediate said beater pinion and said internal gear, and means for checking the rotation of said frame.

9. In a manure spreader, a rotatable beater journaled on bearings rotatable about a common axis eccentric to the axis of said beater and passing within the circles of the said bearings, means for rotating said bearings to carry the axis of the beater from a vertical plane in front of the axis of the bearings into a vertical plane at the rear of the axis of the bearings.

10. In a manure spreader, the combination of the supporting wheels, the load carrying body, the rotary distributing beater, the movable bottom, and power connections between the said supporting wheels and the beater, said connections being positioned entirely within the confines of the beater.

11. In a manure spreader, the combination of the rear ground wheels, the front supporting wheels, the load carrying body, the rotary distributing beater, the gearing for transmitting rotary motion from the ground wheels to the beater in a direction opposite to the rotation of the ground wheels, the said gearing being positioned entirely within the axial limits of the beater.

12. In a manure spreader, the combination of the rear axle, the wheels carried by the axle, the front supporting wheels, the load-carrying body, the shredding and distributing devices arranged to move upward in front of the axle and throw the material over the axle upon the ground, and gearing transmitting power from the axle to the said devices, the said gearing being positioned entirely within the confines of the said devices.

13. In a manure spreader, the combination of the rear axle, ground wheels carried thereby, the front supporting wheels, the load-carrying body, the distributing beater for lifting material from in front of the axle and throwing it rearward upon the ground, and the power transmitting devices between the axle and the beater, said devices being positioned within the circumferential lines of the beater and axially positioned within the ends of the said beater.

14. In a fertilizer distributer, the combination of the body, the means for supporting and feeding the load material through the body, and the vertically adjustable beater supported independently of the body upon the axle and rotating around it.

15. In a fertilizer distributer, the combination of the body, the means for supporting the load material and feeding it along the body, and the longitudinally swinging beater supported independently of the body upon the axle, and rotating around it.

16. In a fertilizer distributer, the combination of the body, the means for supporting the load material and feeding it along the body, and the beater rotating around and mounted on the axle and adjustable longitudinally of the body.

17. In a fertilizer distributer, the combination of the body, the means for supporting the load material and feeding it along the body, and the beater rotating around and supported on the axle independently of the body and movable toward and from the load material.

18. In a fertilizer distributer, the combination of the body, the means for supporting the load material and feeding it along the body, the beater rotating around the axle, and the swinging carrier for the beater supported on the axle independently of the body.

19. In a fertilizer distributer, the combination of the body, the means for supporting the load material and feeding it along the body, the beater rotating around and supported on the axle independently of the body, and means for moving the beater from one position to another vertically.

20. In a fertilizer distributer, the combination of the body, the rear wheels, the means for supporting and feeding the load material, and the beater arranged to have its axis adjustable from a position in front of the axis of the rear wheels to a position in the rear of the said axis.

21. In a fertilizer distributer, the combination of the body, the rear wheels, the means for supporting and feeding the material, and the beater arranged to have its axis swing longitudinally across the vertical plane of the axis of the wheels.

22. In a fertilizer distributer, the combination of the body, the movable bottom for advancing the load, the axle, the ground wheels thereon, the beater mounted on an axis remote from the axis of the axle and rotating around and supported directly on the axle and means for moving the beater to or away from the load.

23. In a fertilizer distributer, the combination of the beater, the axle, the ground wheels mounted thereon, the beater mounted on an axis remote from the axis of the axle, and bearings for the beater upon which it rotates and arranged to rotate around the axis of the axle.

24. In a fertilizer distributer, the combination of the body, the axle, the wheels mounted thereon, the beater mounted on an axis remote from the axis of the axle, bearings supported by the ground wheels and carrying the beater which rotates thereon around the axis of said wheels independently of the body, and means for swinging or rocking said bearings about the axis of the wheels as a center.

25. The combination of the rotary beater, the ground wheels, a driving member rotating around the axis of the ground wheels, a beater rotating around said axis, a driven member carried by the beater, means for operatively connecting said members, eccentric bearings for the beater, and means for rocking the bearings to connect and disconnect the driven and the driving members.

26. The combination of the ground wheels, the beater rotating around their axis, the driving member actuated by the ground wheels, the driven member carried by the beater, both the driving and driven members being situated between the ends of the beater, means for operatively connecting said members, and the eccentrically mounted bearings for the beater adapted to be moved and cause said means to connect and disconnect the driving and driven members.

27. The combination of the beater, the driven element operatively connected to the beater, the driving element, and adjusting means for bodily moving one of the said elements to one position relative the other when power is to be transmitted to the beater, and to another position relative thereto when the transmission of power is to be stopped, the said driving and driven elements and said adjusting means being mounted within the beater and between the ends thereof.

28. The combination of the body, the ground wheels, the beater supported on said wheels independently of the body, the driving wheel actuated by the ground wheels, the driven wheel carried by the beater, and the connecting devices intermediate of said wheels and bodily movable from one operative position to another position, relative to the axis of the driving wheel, said driving wheel said driven wheel and connecting devices being located in the transverse planes of the beater and between the ends thereof.

29. The combination of the ground wheel, the gear wheel carried by the ground wheel, the gear wheel carried by the beater, the gear wheels intermediate of the two aforesaid gear wheels, and means for bodily moving all of the intermediate gear wheels from one operative position to another relative to the axis of the first aforesaid gear wheel, the intermediate gear wheels and the moving means being situated in the transverse planes of the beater and between the ends thereof.

30. The combination of the ground wheels, the beater, the driving wheel in the transverse planes of the beater and between the ends thereof, the driven wheel carried by the beater and rotary power transmitting means between the driving wheel and the driven wheel and adapted to be thrown to one position relatively to the driving wheel when power is to be transmitted to the driven wheel and to another position relatively thereto when the transmission of power is to be stopped.

31. The combination of the ground wheels, the bodily movable beater, the prime driving wheel actuated by the ground wheels, the driven wheel carried by the beater, and intermediate power transmitting devices which are idle for power transmission when the beater is in one position and which are situated for power transmission from the driving gear wheel to rotate the beater when the beater is moved bodily into another position.

32. In a manure spreader, a beater, a pair of ground wheels, mechanism for driving the beater from said wheels comprising a driving member rotating about a fixed axis coincident with the axis of the ground wheels and a driven member on an axis coincident with the axis of the beater, eccentric bearings for the beater, and means for rotating the bearings of the beater to carry said driven member to one position, in relation to the driving member, when power is to be transmitted to said driven member, and to carry it to another position, relative thereto, when the transmission of power is to be stopped.

33. In a manure spreader, the combination of the load support, a pair of ground wheels, a beater movable bodily toward and from the load, a beater driving mechanism comprising a wheel rotated by said ground wheels and fixed in relation to their axes, a driven member carried by the beater, eccentric bearings for the beater, and means for rotating said eccentric bearings to bring said driven and driving members to a predetermined position for the transmission of power to the beater at the time when the beater is moving relatively rearward from the load.

34. In a fertilizer distributer, the combination of the load-carrying body, the rear ground wheels, the through axle extending from one wheel to the other and situated in the horizontal lines of travel of the load in the vehicle, the beater arranged to revolve around the axis of the axle and to have its axis adjusted from one position longitudinally of the body to another, and power transmitting devices interposed between the ground wheels and the beater for rotating the latter.

35. In a fertilizer distributer, the combination of the load-carrying body, the rear ground wheels, the through axle extending from one wheel to the other and situated in the horizontal lines of travel of the load, the beater directly supported on the axle and revolving around the axis thereof and having its axis movable from one position to another relative to the wheel axis, and power transmitting devices interposed between the ground wheels and the beater.

36. In a fertilizer distributer, the combination of the load carrying body, the rear ground wheels, the axle extending from one wheel to the other and situated in the horizontal lines of travel of the load, the beater supported upon and revolving around the axle and having its axis movable from one position to another relatively to the wheel axis, the power transmitting devices interposed between the ground wheels and the beater and comprising a prime driving element and a driven element connected with the beater, and means for throwing the said driving and driven elements into operative relationship for causing power to be transmitted to the beater and also throwing them out of said relationship.

37. In a manure spreader, the combination with a load-carrying body, ground wheels in close proximity to the sides of the body, a rotary beater within the body comprising peripheral operative parts extended to points relatively close to the sides of the body and also radially arranged supports therefor remote from the end of the beater whereby there is formed an interior chamber open at the end, of the prime ground-wheel-actuated driving element, the driven element secured to the beater, the intermediate power transmitting devices, said prime driver, driven element and intermediate transmitting devices being all mounted in the said chamber within the confines of the beater, and manually controllable devices extending from the interior of said chamber to points outside the confines of the beater and adapted to throw said transmitting devices into power transmitting relationship with the beater and to throw them out of such relationship.

38. In a manure spreader, the combination of the vehicle body, the ground wheels, the beater having peripheral operative parts and interior radial supports therefrom remote from the end of the beater whereby an open chamber is provided at the end and within the confines thereof, a prime ground-wheel actuated driving element, a driven element secured to the beater, power transmitting devices between the said prime driving element and the said driven element and adapted to be relatively bodily stationary when power is to be transmitted to the beater and to be bodily movable relatively to the prime driver when the transmission of power is to be stopped, the said prime driver, the driven wheel and the transmitting devices being located within the said chamber, and means for operating the transmitting devices and extending from the interior of said chamber to points outside of the confines of the beater, and adapted to stop or permit movement bodily of the said power transmitting devices.

Dated this 29th day of September, 1911.

THEOPHILUS BROWN.

Witnesses:
 PENELOPE COMBERBACH,
 NELLIE WHALEN.

Copies of this patent may be obtained for five cents each, by addressing the "Commissioner of Patents, Washington, D. C."